Feb. 20, 1968     E. M. CARLIN ET AL     3,369,403

HYDRAULIC MUSCLE STRENGTH DEVELOPING APPARATUS

Filed Oct. 23, 1965     2 Sheets-Sheet 1

INVENTORS
EDGAR M. CARLIN
DOUGLAS A. DEAN
BY
*Fetherstonhaugh & Co.*
ATTORNEYS

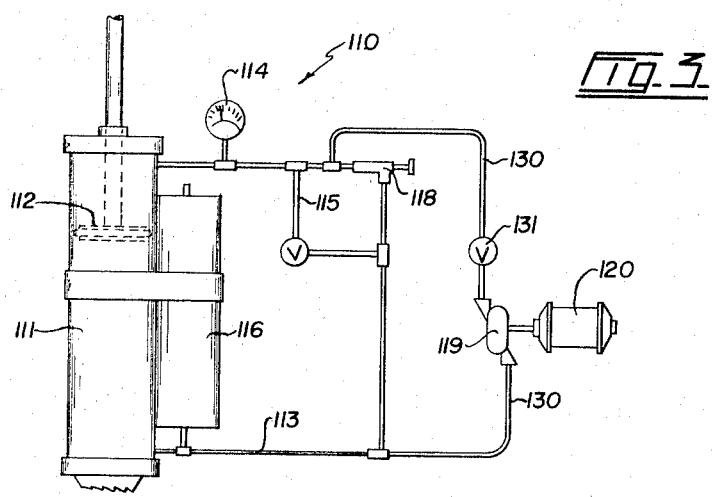
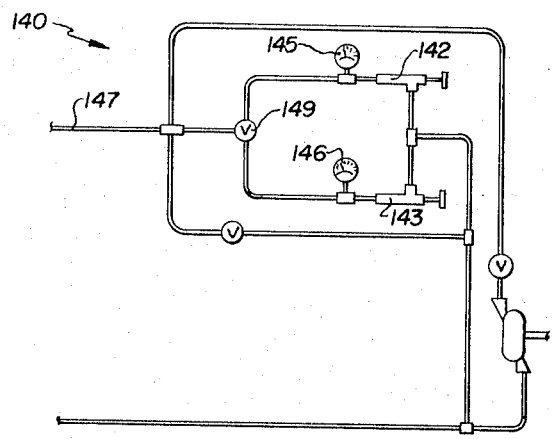

United States Patent Office 3,369,403
Patented Feb. 20, 1968

3,369,403
HYDRAULIC MUSCLE STRENGTH
DEVELOPING APPARATUS
Edwar M. Carlin, White Rock, British Columbia, and
Douglas A. Dean, Burnaby, British Columbia, Canada, assignors to Exotronic Systems Ltd.
Filed Oct. 23, 1965, Ser. No. 503,378
3 Claims. (Cl. 73—379)

ABSTRACT OF THE DISCLOSURE

Hydraulic muscle strength developing apparatus having a cylinder, anchored at one end, and a piston equipped with an operating handle to permit the exerciser to resist movement of the piston caused by the introduction of a pressurized hydraulic fluid into the opposite end of the cylinder.

Figure 1:
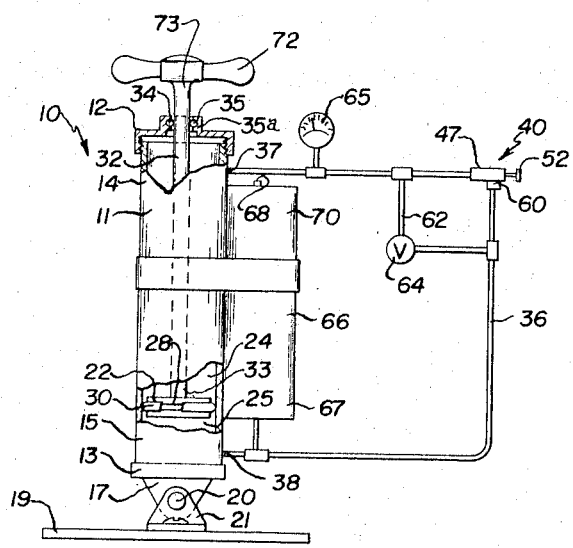

This invention relates to training apparatus for the development and testing of muscle groups in the human body.

In the proper development of muscle groups, all types of muscular contractions must be employed, viz. isotonic, isometric and eccentric. It is also important, particularly for those requiring rehabilitation, that the training taken shall not impose too great a strain on the cardiovascular system. The training apparatus used in the latter cases must be such as to provide for absolute control of the strains imposed on the muscle groups at one time being exercised, and yet which is capable of graduation as the person taking rehabilitative exercises gains strength.

The corresponding strains to be taken by exercised muscle groups in the case of athletes must, of course, be of a higher order than those taken by individuals engaged in rehabilitative exercises. However, similar controls must exist in order that the athlete may gradually increase his capabilities and know exactly what they are. Heretofore, to achieve isometric contractions of the muscles, it has been usual practice for the individual taking training or exercise to strain against a fixed immovable object. This does not permit measurement of the strain imposed. On the other hand, as isotonic contractions have been normally achieved by the lifting of bar bells and the like, the loads to be lifted are not capable of infinite variations as are the loads employed in equipment to achieve eccentric contraction of the muscles.

The present invention provides a training apparatus whereby it is possible to achieve, whenever required, all forms of muscular contractions throughout an infinite range of applied loads. The present invention furthermore provides a training apparatus which is compact and easily portable and which, without the provision of extra equipment, is suitable for those requiring muscle rehabilitation as well as for athletes.

The present invention also provides a training apparatus wherein the strain imposed on the various muscle groups undergoing contraction is at all times measureable and therefore provides means where the muscular capabilities particularly for athletes may be easily gauged.

The present invention comprises a cylinder closed at both ends, means for anchoring the cylinder at one end, a piston movable in the cylinder and dividing the latter into two variable sized chambers arranged to be filled with a hydraulic fluid, means to move the piston, conduit means interconnecting the chambers for effecting the passage of fluid from one to another of them when the piston is moved, means by means of which the passage of fluid between the chambers is restricted so as to increase the fluid pressure in one of the chambers, and a fluid pressure gauge connected in the conduit means for measuring fluid pressure in said one chamber.

It is preferred that the training apparatus of this invention may be employed to achieve all forms of muscular contraction as hereinbefore noted. However, it is to be appreciated that in certain circumstances, the individual requiring training may only need to employ one or perhaps two of the varied forms of muscular contraction. It is contemplated, therefore, that varied forms or embodiments of the training apparatus may be employed in the manner hereinafter described.

Figure 2:
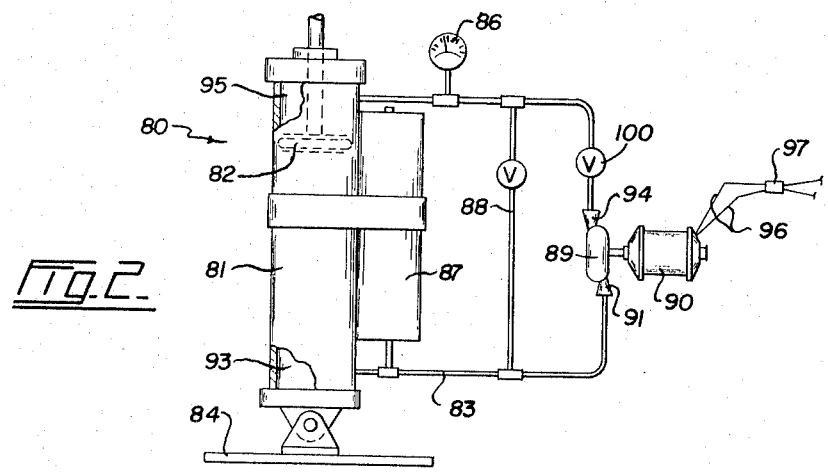
Figure 4:
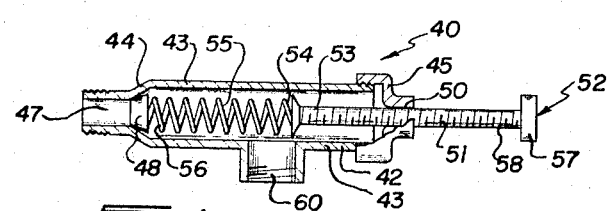

In the drawings which illustrate the various embodiments of the training apparatus, FIGURE 1 is an illustration of one embodiment thereof in which the piston and cylinder are illustrated in mechanical form, portions thereof being removed for clarification, and the hydraulic fluid controls being illustrated schematically, FIGURE 2 is an illustration of a second embodiment of the invention, the piston and cylinder and control elements being illustrated in the manner of FIGURE 1, FIGURE 3 is another embodiment of the invention, the piston and cylinder and hydraulic control elements being illustrated in the manner of FIGURES 1 and 2, FIGURE 4 is a central section of a hydraulic control valve, and FIGURE 5 is another embodiment of the invention illustrated in the same manner as are the embodiments illustrated in FIGURES 1, 2 and 3.

Referring to the drawings, FIGURE 1 illustrates one embodiment 10 of the invention. Embodiment 10 comprises an elongated cylinder 11 closed by caps 12 and 13 at each end 14 and 15 respectively. Cap 13 has a centrally extending flange or leg 17 by means of which the cylinder is pivotally anchored to a plate 19, the flange being pivotally mounted on a horizontal shaft 20 which extends between two upstanding bracket elements 21 secured to the base plate 19.

Slidably mounted for reciprocation in the cylinder 11, is a piston 22, the latter dividing the cylinder into a pair of variably sized chambers 24 and 25 respectively. The piston is formed having a peripheral groove 28 in which a rubber O-ring 30 is inserted, the latter being of sufficient diameter so as to effect a tight yet slidable seal with the inner wall of the cylinder.

An elongated piston rod 32 is secured at one end 33 to the piston and slidably extends through a suitably sized aperture 34 formed centrally of cap 12. An annular lip seal 35 is fitted in an annular grove 35a formed in the walls of the cap 12 at the aperture which is slidably and sealably engaged to the piston rod 32.

Communication between chambers 24 and 25 is provided by means of a conduit 36 which extends between ports 37 and 38 formed in the cylinder adjacent its ends 14 and 15 respectively. In this conduit is incorporated a unidirectional control valve 40, the latter being illustrated in FIGURE 4 of the drawings.

This valve comprises an elongated cylindrical housing 42 having side walls 43 and end walls 44 and 45. End wall 44 is provided with a port 47 which is conically shaped to form a seat for a conically shaped plug 48. End wall 45 has a threaded aperture 50 formed centrally thereof to threadedly receive an elongated threaded shaft 51 of an adjusting screw 52. The inner end 53 of the shaft is arranged to bear against one end 54 of a compression spring 55, the other end 56 of the latter bearing against the plug 48. The adjusting screw 52 is arranged to be moved toward and away from the plug 48 by means of a knurled knob 57 on the other end 58. The side wall 43 of the housing 42 is also provided with a port 60.

The conduit 36 is connected to the housing at ports 47 and 60 so that there is a direct connection between port 37 of the cylinder and port 47 of the valve 40, and a direct connection between port 38 of the cylinder and port 60 of the valve so that a hydraulic fluid with which the cylinder is to be filled may only flow in the direction of port 37 to port 38, the valve 40 acting as a check valve for the flow in the opposite direction.

The conduit 36 is also provided with a by-pass conduit 62, said by-pass conduit being connected to conduit 36 on either side of the valve 40 and being provided with a manually operated shutoff valve 64 by means of which the by-pass conduit may be alternately opened and closed.

A hydraulic pressure gauge 65 is connected to that portion of the conduit 36 which extends between port 37 of the cylinder and the valve 40, and a vertically elongated equalizing tank 66 connected at its lower end 67 into that portion of the conduit 36 which extends between port 38 of the cylinder and port 60 of the valve 40, the tank 66 being vented as at 68 at its upper end 70.

In the operation and use of the embodiment 10 of the invention, both chambers 24 and 25 of the cylinder and the conduit 36 are filled with hydraulic fluid, the equalizing tank 66 only being partially filled. The shut-off valve 64 is opened and the piston positioned at the lower end 15 of the cylinder 11. The shut-off valve 64 is then closed and the individual taking the training then, by means of a handle 72 secured to the upper end 73 of the piston rod, attempts to pull the piston upwardly in the cylinder. Normally, with a clear unobstructed passage through conduit 36, the movement of the piston upwardly would not be restrained. However, the valve 40 offers a restraining action to the passage of hydraulic fluid therethrough which can only be overcome by applying sufficient force to lift the plug 48 off its seat against the compression spring 49. The pressure required so as to move the plug may, of course, be adjusted by adjusting the compression exerted thereupon by the compression spring, this adjustment being made possible by the adjusting screw 52. The restraining action of the plug may therefore be varied considerably to suit the needs of each individual taking the training or exercise.

Embodiment 10 of the invention is, of course, primarily designed for those requiring isotonic contraction of the muscles. However, by turning down adjusting screw 52 sufficiently so that the individual taking exercise will not be able to exert sufficient pressure to lift the plug 48 from its seat, isometric contraction to the muscle groups may also be achieved.

FIGURE 2 illustrates another embodiment 80 of the training apparatus. Embodiment 80 is in most respects similar to embodiment 10 having a cylinder 81, piston 82 and interconnecting conduit 83 similar to the cylinder 11, piston 22 and conduit 36 of the latter embodiment. The cylinder 81 is again mounted on a base plate 84 in the same manner in which the cylinder 11 is mounted on base plate 19. Embodiment 80 also has a pressure gauge 86, an equalizing tank 87 and a valve conduit by-pass 88 connected into conduit 83 in the same manner as their counterparts of embodiment 10 are connected to the conduit 36 thereof.

In place of the valve 40 of embodiment 10, however, embodiment 80 is provided with a fluid pump 89 preferably of the gear type which may be driven by a small electric motor 90. This pump 89 is arranged so that its intake 91 is connected to chamber 93 of the cylinder, said chamber 93 corresponding to chamber 25 of cylinder 11 whereas its discharge 94 is connected to chamber 95, the latter corresponding to chamber 24 of cylinder 11. The electric motor 90 is connected by leads 96 to a suitable source of power and is controlled by a switch 97. There is also provided in conduits 83 on the discharge side of the pump 89, a check valve 100 arranged to prevent back pressure on the pump 89.

In the use of embodiment 80, the poston is positioned in the upper part of the cylinder 81 and, by means of the switch 97, the pump is then operated. The pressure of the hydraulic fluid being discharged by the pump will push the piston 82 downwardly, the individual taking the training straining upwardly thereagainst. The force with which the individual strains upwardly against the piston may, of course be measured by the pressure gauge 86. When the piston reaches the bottom of the cylinder 81, the valved by-pass 88 may then be opened and the piston returned to the upper part of the cylinder.

Embodiment 80 of the training apparatus thereby provides means whereby eccentric muscular contraction may be achieved.

FIGURE 3 illustrates another embodiment 110 of the apparatus, this embodiment being simply a combination of embodiments 10 and 80. Embodiment 110 has the same piston, cylinder, conduits, gauge, by-pass and equalizing tank arrangement of their counterparts as embodiments 10 and 80, being accorded the numerals 111, 112, 113, 114, 115 and 116 respectively. Embodiment 110 furthermore has the unidirectional spring- urged valve 118 connected into conduit 113 in the same manner as is valve 40 connected into conduit 36.

In embodiment 110, however, the fluid pump 119 driven by an electric motor 120, the latter being comparable to pump 89 and electric motor 90 of embodiment 80, is connected through conduits 130 into conduit 113 in parallel with valve 118, the discharge from the pump 119 entering conduit 113 ahead of valve 118 while its intake is connected to conduit 113 behind valve 118. Conduit 130 is also provided with a check valve 131 which affects the flow of hydraulic fluid therethrough in the same manner as does check valve 100 in conduit 83.

Embodiment 110 may be employed to achieve all forms of muscular contractions. If it is desired to achieve only isometric and isotonic muscular contractions, the pump 119 may be left inoperative. This will permit embodiment 110 to be operated in the same manner as embodiment 10.

When the pump is put into operation, the flow of fluid therethrough entering conduit 113 will move piston 112 downwardly in the same manner as piston 82 is moved in embodiment 80. However, in embodiment 110, the pressure applied by the pump is controllable by the valve 118. This will permit the pressure to be applied by the piston 112 to be limited to a predetermined amount as may be measured by the gauge 114. It will be appreciated, therefore, that if the apparatus is used to rehabilitate individuals whose muscles are damaged, a limited hydraulic pressure may be employed to move the piston so that the muscles of such person will not be overstrained.

As indicated hereinbefore, it is contemplated that the apparatus in all its embodiments shall be available for use for athletes and individuals requiring rehabilitation.

FIGURE 5 illustrates another embodiment of the apparatus which is designed to accurately control and measure the necessary greatly varied hydraulic pressures which will result from the use of the apparatus by athletes and rehabilitants.

Embodiment 140 is the same in every respect to embodiment 110 with the exception of the replacement of valve 118 with two similar valves 142 and 143, each having its own gauge 145 and 146, respectively. Valve 142 and corresponding gauge 145 are low pressure types adapted to control and measure low hydraulic pressures, while valve 143 and gauge 146 are adapted to control and measure high hydraulic pressures. In embodiment 140, therefore, valve 142 and gauge 145 are connected in parallel in conduit 147 which corresponds to conduit 113 through a two-way selector valve 149, the latter being of known construction, whereby either one of them alternately may be selected for measuring the pressure in conduit 147.

The hydraulic controls herein described and as illustrated in the drawings may be incorporated in a control located remote from the piston and the cylinder of each of the embodiments so as to be operated by a person other than the one taking exercise. In this case, the conduit connection between the cylinder and the hydraulic controls may be made by way of flexible conduits. However, it will be appreciated that such controls may be very easily secured to the cylinder of the apparatus itself in a manner whereby the various controls and gauges may be quickly and easily operated. In view of the fact that the apparatus, in its various embodiments may be used in varied circumstances, it is therefore not proposed to illustrate or describe any one form of the latter. It is to be understood, however, that any form selected must be suitable for and be capable of being operated by the individual taking training or exercise.

What I claim as my invention is:

1. Training apparatus comprising a cylinder closed at both ends, means for pivotally anchoring the cylinder at one end, a piston dividing the cylinder into two variable sized chambers, said chambers being adapted to be filled with a hydraulic fluid, conduit means interconnecting the chambers for effecting the passage of fluid from one to another of them when the piston is moved, a fluid pump connected in the conduit means for transferring the hydraulic fluid between said chambers, said pump being arranged to force the fluid into one of the chambers so as to move the piston towards the other, a piston rod connected to the piston and extending through the end of the cylinder opposite its anchored end, handle means connected to the piston rod whereby the movement of the piston may be resisted and a fluid pressure gauge connected in the conduit means for measuring fluid pressure in said one chamber.

2. Training apparatus as claimed in claim 1 including at least one pressure relief valve connected to the conduit in parallel with the pump, said valve being arranged to permit the return of fluid under constant pressure from said one chamber to the other.

3. Training apparatus as claimed in claim 2 including a fluid by-pass means connected in the conduit means in parallel with the pressure relief valve and a valve in said by-pass means operable to open and close the latter.

References Cited

UNITED STATES PATENTS

| 183,269 | 10/1876 | Marsh | 73—380 |
| 1,707,449 | 4/1929 | Rodale | 73—379 |
| 2,068,578 | 1/1937 | Stronach | 272—79 |
| 2,255,711 | 9/1941 | Noor | 73—379 |
| 2,825,563 | 3/1958 | Lanton | 272—79 |

RICHARD C. QUEISSER, *Primary Examiner.*

JAMES J. GILL, *Examiner.*

J. H. WILLIAMSON, *Assistant Examiner.*